July 10, 1923.
N. P. WHITTIER
GASOLINE TANK AND FEED LINE LOCK
Filed March 30, 1920
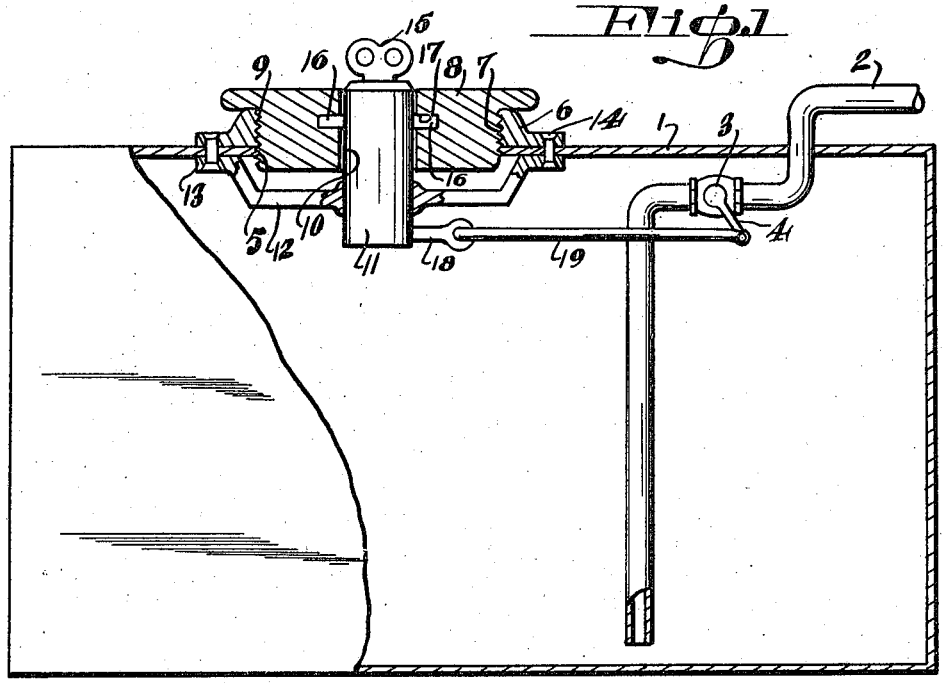
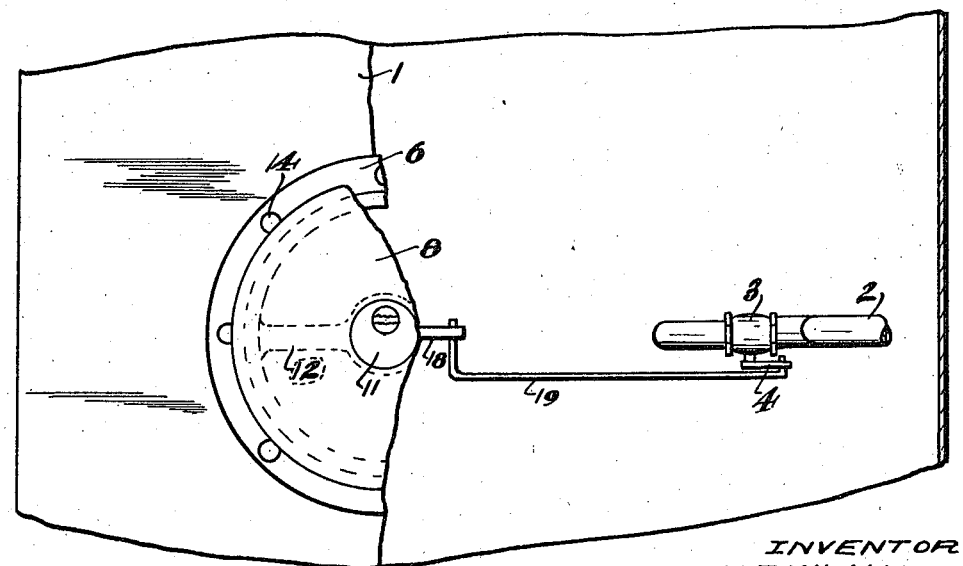
INVENTOR
N. P. Whittier
By Hazard & Miller
Att'ys.

Patented July 10, 1923.

1,461,507

UNITED STATES PATENT OFFICE.

NELSON PAUL WHITTIER, OF BEVERLY HILLS, CALIFORNIA.

GASOLINE TANK AND FEED-LINE LOCK.

Application filed March 30, 1920. Serial No. 369,992.

*To all whom it may concern:*

Be it known that I, NELSON PAUL WHITTIER, a citizen of the United States, residing at Beverly Hills, in the county of Los Angeles and State of California, have invented new and useful Improvements in Gasoline Tanks and Feed-Line Locks, of which the following is a specification.

This invention relates to means for simultaneously locking the closure cap of a tank and a controlling valve which is arranged in the outlet pipe from said tank. The invention is particularly adapted for use on a gasoline tank having a valve controlled gasoline feed pipe where it is desired to lock the closure cap of the tank and at the same time lock the valve of the feed pipe in closed position. It is the object of the invention to provide a simple device of this character which will be positive and efficient in its action and of inexpensive construction.

In the accompanying drawings,

Figure 1 is a vertical section taken through a gasoline tank constructed in accordance with my invention.

Fig. 2 is a top plan view of the same partly broken away.

In the drawings a tank is shown at 1 having a feed pipe 2 extending outwardly therefrom, said pipe having a usual valve 3 arranged therein, this valve having a swinging actuating lever 4.

The closure for the tank includes an opening 5 formed therein surrounded at the outside of the tank by a collar 6 internally screw-threaded as shown at 7 to be engaged by the closure cap 8 provided with corresponding screw threads 9.

The closure cap is centrally apertured as shown at 10 and a cylindrical lock 11 extends upwardly through said aperture, said lock being fixed relative to the tank as by bracket arms 12 secured to opposite sides thereof, preferably, within the tank. The arms 12 are shown as terminating at their outer ends in a collar 13 resting upon the under side of the tank, preferably, below the outer edge of collar 6 so that the collars 6 and 13 may be secured to the tank by rivets 14 engaging both of said collars and the tank.

The lock 11 may be provided with a usual key 15 and includes laterally projecting bolts 16 adapted to be withdrawn into the lock casing or to be projected therefrom so as to engage corresponding recesses 17 formed in the closure cap 8 by turning of the key 15. By this arrangement the closure cap 8 may be readily locked against rotation and thereby held against removal from the tank.

The lock is also provided with a laterally projecting bolt 18 which is moved laterally relative to the lock casing simultaneously with the movement of bolts 16. An actuating rod 19 is connected at its respective ends to the actuating lever of the valve 3 and to bolt 18, the parts being so arranged that when key 15 is turned so as to project the bolt 18 outwardly, the actuating lever 4 will be swung so as to close valve 3 and said valve will be locked in closed position until key 15 is turned so as to move bolt 18 in the opposite direction, thereby swinging the actuating lever 4 in the reverse direction to open valve 3.

By the constructions thus described it will be seen that when the key 15 is turned to locking position the bolts 16 will be projected outwardly into locking engagement with the closure cap thereby preventing rotation and removal of the same, and at the same time the bolt 18 will be projected outwardly to cause closing of valve 3. The closure cap and the valve 3 will thus be locked in closed position until key 15 is turned in the reverse direction thereby withdrawing the bolts 16 into the lock casing and permitting rotation of the closure cap for removing the same and also reversely moving bolt 18 so as to open the valve 3.

Various changes may be made without departing from the spirit of the invention as claimed.

What is claimed is:

1. A tank having a rotatable closure cap, an outlet pipe, and a rotatable valve controlling the pipe, and means associated with the cap and valve for locking the two against rotation.

2. A tank having a rotatable closure cap, an outlet pipe, and a rotatable valve controlling the pipe, and means permanently secured within the tank and associated with the cap and valve for locking the two against rotation.

In testimony whereof I have signed my name to this specification.

NELSON PAUL WHITTIER.